PATENTED JUL. 4 1871.

116771

Fig. I.
Fig. II.
Fig. III.
Fig. IV.
Fig. V.
Fig. VI.

John & Jacob Stein
Improvement in
Photographic Plate Holders

Witnesses
Inventors 116,771

UNITED STATES PATENT OFFICE.

JOHN STOCK AND JACOB STOCK, OF NEW YORK, N. Y.

IMPROVEMENT IN PHOTOGRAPHIC APPARATUS.

Specification forming part of Letters Patent No. 116,771, dated July 4, 1871.

*To all whom it may concern:*

Be it known that we, JOHN STOCK and JACOB STOCK, both of New York, in the State of New York, have invented certain Improvements in Plate-Holders, Silver and Water-Baths for Photographic Cameras, of which the following is a specification:

Figure I represents a section of the improved plate-holder. Fig. II shows a section of the plate-holder and silver-bath. Fig. III represents a section of the plate-holder and developing-box. Figs. IV and V represent sections of developing-box and water-bath, and Fig. VI shows a top view of the developing-box.

Similar letters represent similar parts in all the figures.

In the accompanying drawing, A is the plate-holder box, provided with the usual slide B at its forward part, and attached to the camera in the usual manner. In the inside of this box A a plate, C, is arranged, connected to a rod, D, by which the same can be moved inward or outward. To this plate C brackets E are fastened, provided with suitable grooves to receive the glass plate F. G are pins, attached by means of suitable springs to the back of the box, and projecting through the plate C, arranged to press against the back of the glass plate F when fixed in the box and in its proper place, for the purpose of holding the same firm and steady. The plate C is made capable of expanding sidewise, and the forward end of the box A is on one side enlarged or beveled, $x$, (see Figs. II and III,) to allow, when the plate C is moved in that position, this plate to expand so as to bring the brackets E E further apart and allow thereby the plate F to fall out of the grooves in said brackets E. The otherwise-prepared glass plate F being fixed in the box A, this box A is placed upon the silvering-bath H, as represented in Fig. II, when the slide B is removed and the glass plate F lowered into the silver-bath H, in the bottom of which projections $m$ are arranged, upon which the ends of the brackets E rest, and which prevent the plate C from being moved too far downward, so as not to allow the said plate C to be moved opposite the bevel $x$, and open or expand during this operation. When the silvering process is completed the plate C, together with the glass plate F, is moved inward again, the slide B inserted to close the box and to prevent the admission of light, when the box A can be removed from the silver-bath H. After the picture has been taken and the same requires to be developed, the box A is fixed upon the developing-box J. (See Fig. III.) This developing-box J is arranged with a movable drawer, K, a suitable observing-glass, L, and pipe M, connected with a trough, N, for the admittance of water or other suitable liquid upon the plate F for the desired purpose. When the box A is fixed upon the developing-box J, (see Fig. III,) the drawer K is pulled outward and the plate C, with the glass plate F affixed, moved downward so as to pass the bevel $x$ in said box A, when, as above described, the plate C will expand so as to allow the glass plate F to fall out of the grooves in the brackets E into the developing-box J. The plate C is then moved back again into the box A, and the drawer K moved inward over the glass plate F, when the box A is removed and the developing-box J turned over, when the glass plate F will be supported by the side pieces forming the drawer. Water or any other suitable liquid can now be poured upon the glass plate F, through the trough N and pipe M, after the developing-box J has been fixed, upon the water-bath box P, (see Fig. IV,) and the progress of developing observed through the glass plate L. When this process is completed the drawer K is pulled outward, (see Fig. V,) when the glass plate F will be pushed off the sides of this drawer and fall into the water-bath P.

From the above it will be perceived that, by the combination of the different boxes and baths with each other, all the operations required to finish the photographic glass plate will be performed without handling the plate and without the danger of exposing the same to the light, and the whole process can be easily performed without the necessity of a dark room, which is at present required; and when pictures are taken in the open air the plate can be finished in the field.

What we claim as our invention, and desire to secure by Letters Patent, is—

1. The box A, with the plate C, brackets E E, pins G G, and rod D, arranged and constructed substantially in the manner and for the purpose as hereinbefore described.

2. The bevel $x$ or enlargement of the forward end of the box A, when arranged with an expanding-plate C, substantially as and for the purpose hereinbefore set forth.

3. The developing-box J, with drawer K, observing-glass L, trough N, and pipe M, in combination with a box, A, constructed as above described, substantially as and for the purpose hereinbefore set forth.

4. The combination of the box A with the silver-bath H, constructed and operating substantially as and for the purpose specified.

5. The combination of the developing-box J with the water-bath P, substantially in the manner and for the purpose hereinbefore set forth.

JOHN STOCK.
JACOB STOCK.

Witnesses:
HENRY E. ROEDER,
JOHN CHRISTIAN.